Patented Aug. 12, 1952

2,606,907

UNITED STATES PATENT OFFICE 2,606,907

BASIC DIOXANES

Frederick F. Blicke, Ann Arbor, Mich., assignor to Regents of the University of Michigan, Ann Arbor, Mich., a corporation of Michigan No Drawing. Application August 4, 1949, Serial No. 108,669

4 Claims. (Cl. 260—338)

This invention relates to new chemical compounds which are valuable as antispasmodics and histamine antagonists, combining a high degree of activity both of a papaverine-like and atropine-like nature with antihistamine action and relatively low toxicity, the compounds being effective as histamine antagonists and having both neurotropic and musculotropic activity, as determined, for example, by capacity to combat spasms produced by histamine, acetyl choline and barium chloride.

The new compounds of the invention are derivatives of 1,3-dioxane having an amino or substituted amino radical aliphatically linked to the 5-carbon atom through a low molecular weight alkylene or oxygen interrupted alkylene group having 1 to 3 carbon atoms. These compounds may be represented by the formula

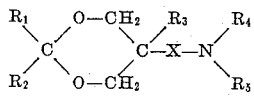

in which $R_1$ and $R_2$ are hydrogen, alkyl, alicyclic, aryl, aralkyl, thianaphthenyl, or thienyl, and may be the same or different, or in which $R_1$ and $R_2$ represent an alicyclic group including the 2-carbon of the dioxane ring as a part of the ring structure, e. g., pentamethylene, in which $R_3$ is hydrogen, methyl or ethyl, in which X is an alkylene or oxygen interrupted alkylene group having 1 to 3 carbon atoms, and in which $R_4$ and $R_5$ are hydrogen, or low molecular weight alkyl groups and may be the same or different, or in which $NR_4R_5$ represents a cyclic amine radical such as piperidino or morpholino.

The compounds of the invention may be prepared in the form of the free bases, or in the form of salts with mineral or organic acids, or in the form of quaternary salts. In general, the hydrochlorides and methiodides are relatively high melting crystalline materials, while the free bases in pure form, are either oils or lower melting crystalline materials. The free bases are distillable at reduced pressures. For use as antispasmodics or as antihistamine agents the compounds will ordinarily be used in the form of an acid addition salt, such as the hydrochloride, or as one of the quaternary compounds, such as the methiodide, methobromide, or the like. In general, the compounds will be administered orally, as tablets, capsules or the like, although for certain special syndromes, such as allergies primarily nasal or dermal in character, they may be compounded for topical application, as in nose drop form or in ointments or creams. For acute spasm or reaction, the compounds in a water-soluble form may be administered parenterally.

In general, the compounds of the invention are conveniently prepared from the corresponding 5-hydroxyalkyl, bromoalkyl, or iodoalkyl 1,3-dioxane, by reaction with the selected amine or aminoalkyl halide, so that the amino or substituted amino group is introduced and aliphatically bound to the 5-carbon atom of the dioxane ring.

Because a number of the intermediates used for the production of the final products are not, so far as I am aware, described in the literature, the following examples, designated 1a through 15a are included to illustrate the production of intermediates used in preparing products of the examples.

Example 1a 2,2 - diphenyl - 5 - methyl - 5 - bromomethyl-1,3-dioxane.—A mixture of 18.3 gm. of 2-methyl-2-bromomethyl-1,3-propandiol and 22.8 gm. of diphenyldimethoxymethane is heated in an oil bath at 100° C. The temperature is then slowly raised until 6.4 gm. of methanol has been distilled. The residue is then cooled and allowed to solidify. After several recrystallizations from methanol the product melts at 91–92°. The yield is 25.8 gm.

Example 2a 2,2 - diphenyl - 5 - methyl - 5 - iodomethyl-1,3-dioxane.—A mixture of 60 gm. of 2,2-diphenyl-5-methyl-5-bromomethyl-1,3-dioxane, 258 gm. of sodium iodide, and 900 cc. of absolute alcohol is heated in a pressure vessel at 100° C. for two days. The mixture obtained is cooled, filtered, washed thoroughly with water and dried. About 60 gm. of product, M. P. 114–115° is obtained.

Example 3a 2,2 - diphenyl - 5 - methyl - 5 - hydroxymethyl-1,3-dioxane.—A mixture of 12.0 g. of 1,1,1-trimethylolethane, 18.2 g. of benzophenone, 100 cc. of benzene and two drops of concentrated sulfuric acid was refluxed in a 200 cc. flask fitted with a condenser and a water trap. After the mixture had been refluxed for twenty-four hours, 1.7 cc. (95%) of water had collected. The cold mixture was washed with 20 cc. of 10% sodium carbonate solution, the benzene layer separated, and the solvent removed under reduced pressure. After the residue had been cooled for some time, it became crystalline. The product melted at 103–104° after it had been recrystallized from petroleum ether (90–100°); yield 20.3 g. (82%).

Example 4a

*2,2 - dibenzyl - 5 - methyl - 5 - iodomethyl - 1,3-dioxane.*—This material is prepared from the corresponding 5-bromomethyl compound (obtained from dibenzyl ketone and 2-methyl-2-bromomethyl-1,3-propandiol by the method given in Example 3a above in a 74% yield melting at 115° after crystallization from alcohol) and sodium iodide by the procedure of Example 2a above. The yield of material, M. P. 119°, is about 96%.

Example 5a

*2,2 - di - p - tolyl - 5 - methyl - 5 - iodomethyl-1,3-dioxane.*—The analogous bromomethyl compound, M. P. 135–136°, is prepared by the procedure of Example 3a above from di-p-tolyl ketone and 2 - methyl - 2 - bromomethyl - 1,3 - propandiol. Using the procedure of Example 2a above this is converted to the 5-iodomethyl compound, M. P. 124–125°.

Example 6a

*2,2 - diphenyl-5-ethyl-5-bromomethyl-1,3-dioxane.*—A mixture of 9.10 g. of benzophenone, 9.85 g. of 2 - ethyl-2-bromomethyl-1,3-propanediol [prepared from 1,1,1-trimethylolpropane and 66% aqueous hydrobromic acid by the procedure of Barbiere et al. Bull. Soc. Chim. (5), 5, 1565 (1928)] 100 cc. of benzene and about 0.1 g. of p-toluenesulfonic acid monohydrate is placed in a flask fitted with a reflux condenser and a water trap. After the mixture has been refluxed for seven hours, 0.9 cc. (100% of theory) water will be collected. The mixture is washed with 10% sodium carbonate solution, and then with water. The benzene layer is separated, the solvent removed, and the residue distilled; yield 12.5 g. (50%); B. P. 165–167° (0.01 mm.) The material becomes crystalline after it has been triturated with absolute ethanol. After recrystallization from methanol, it melts at 69–70°.

Example 7a

*2,5 - dimethyl-5-bromomethyl-1,3-dioxane.*—A mixture of 12.8 g. of 2-methyl-2-bromomethyl-1,3-propanediol 6 g. of acetaldehyde and about 0.3 g. of phosphorus pentoxide is allowed to remain at room temperature for one day in a sealed test tube. The mixture is shaken from time to time. After the addition of 100 cc. of benzene and 30 cc. of 10% sodium carbonate solution, the benzene layer is separated, and the solvent removed. The residue is distilled. The product, a colorless oil which possesses an aromatic odor, boils at 64–66° (3 mm.); yield 12.5 g. (85%).

Example 8a

*2,5 - dimethyl-2-cyclopropyl-5-bromomethyl-1,3-dioxane.*—A mixture of 11 g. of 2-methyl-2-bromomethyl-1,3-propanediol, 5.05 g. of methyl cyclopropyl ketone, 100 cc. of benzene and about 0.1 g. of p-toluenesulfonic acid monohydrate is refluxed in a flask to which a reflux condenser and a water trap are attached. After nine hours, 1.05 cc. (97%) of water will be collected. The mixture is washed with sodium carbonate solution, and then with water. After removal of the solvent and distillation of the residue, 8.0 g. (54%) of a colorless oil is obtained. The oil has an aromatic odor, and boils at 100–102° (3 mm.).

Example 9a

*5 - methyl - 5 - bromomethyl-1,3-dioxane.*—A mixture of 12.8 g. of 2-methyl-2-bromomethyl-1,3-propanediol, 14 g. of 40% aqueous formaldehyde and 7 g. of 85% phosphoric acid is placed in a small distillation flask, and distilled until a temperature of 140° is reached. The lower layer of the two layer distillate is separated and distilled; yield 5.4 g. (40%) of a colorless oil; B. P. 126–127° (68 mm.).

Example 10a

*2,2,5 - trimethyl-5-bromomethyl-1,3-dioxane.*—Eleven grams of 2-methyl-2-bromomethyl-1,3-propanediol, 5.24 g. of reagent acetone and about 0.2 g. of phosphorus pentoxide are allowed to remain in a stoppered flask for three days at room temperature. After the addition of 50 cc. of benzene, the mixture is washed with sodium carbonate solution and then with water. After removal of the benzene, the residue is distilled. The colorless oil, which has an aromatic odor, boils at 73–74° (2 mm.); yield 4.6 g. The higher boiling distillate consists of 1.8 g. of unchanged bromodiol; the yield of product, based on bromodiol which had reacted, is 41%.

Example 11a

*2,2 - pentamethylene - 5 - methyl - 5 - bromomethyl-1,3-dioxane.*—A mixture of 9.15 g. of 2-methyl-2-bromomethyl-1,3-propanediol, 4.9 g. of cyclohexanone and 100 cc. of benzene with about 0.1 g. of p-toluenesulfonic acid monohydrate is refluxed in a 200 cc. flask fitted with a reflux condenser and a water trap. After two hours, 0.9 cc. (100%) of water had collected. The mixture was washed with sodium carbonate solution, then with water, the benzene removed from the solution, and the residue distilled. The colorless oil weighed 11.6 g. (88%) and boiled at 112–113° (13 mm.).

Example 12a

*2 - phenyl - 5 - methyl - 5 - bromomethyl - 1,3 - dioxane.*—A mixture of 6.4 g. of benzaldehyde, 11 gm. of 2-methyl-2-bromomethyl-1,3-propanediol, 100 ml. of benzene, and about 0.1 gm. of p-toluenesulfonic acid is refluxed under a condenser and water trap for 3½ hours. During this period 100% of the calculated amount of water collects in the trap. The benzene solution is then washed with sodium carbonate, then water, and finally distilled. The product is collected at 147–149° at 3 mm. The yield is 14.7 gm.

Example 13a

*2 - phenyl - 2,5 - dimethyl - 5 - bromomethyl - 1,3-dioxane.*—Using the procedure of Example 12a a yield of 11.3 gm. of product, B. P. 126–128° at 3 mm. is obtained from 6 gm. of acetophenone and 9.15 gm. of 2-methyl-2-bromomethyl-1,3-propanediol.

Example 14a

*2 - phenyl - 2 - cyclohexyl - 5 - methyl - 5 - iodomethyl-1,3-dioxane.*—This compound is obtained from the analogous bromomethyl dioxane using the procedure of Example 2a. The product melts at 118–119° after crystallization from alcohol. The bromo compound is prepared using the procedure of Example 6a in a yield of 8.4 gm., M. P. 104–105°, from 9.15 gm. of 2-methyl-2-bromomethyl-1,3-propanediol and 9.4 gm. of phenyl cyclohexyl ketone.

Example 15a

*2,5 - dimethyl - 2 - (3 - thianaphthenyl) - 5-bromomethyl-1,3-dioxane.*—This compound is obtained by the procedure of Example 12a using as starting materials 3-acetylthianaphthene, and 2-methyl-2 - bromomethyl - 1,3 - propanediol. It is obtained as an oil and used without purification.

The following examples, 1 through 22, illustrate the preparation of typical compounds of the invention, but the invention is not limited thereto. It is to be noted that all of the illustrated compounds possess high antihistamine and antispasmodic activity and have a relatively low toxicity. For example, the compound of Example 1, in the form of its hydrochloride, will completely relax the contraction produced in isolated guinea pig intestine by 1:1,000,000 histamine diphosphate in concentrations of 0.5 microgram per millimeter, will produce definite relaxation of normal isolated rabbit jejunum in concentrations of 1:100,000, will completely counteract the contraction produced by 1:1,000,000 acetylcholine in isolated rabbit jejunum in concentrations of 1:200,000 and the contraction produced by 1:10,000 barium chloride in isolated rabbit jejunum in concentrations of 1:200,000. In the form of the methiodide, it is somewhat less active as an antihistamine, requiring 5.0 micrograms per millimeter to combat the 1:1,000,000 histamine diphosphate, but relaxes the normal rabbit jejunum in lesser concentrations of 1:200,000, the activity against acetylcholine and barium chloride being the same. The compound of Example 2, in the same tests, had an antihistamine activity of 5 micrograms per millimeter, relaxed normal intestinal strip at concentrations of 1:5,000,000 and counteracted the acetylcholine and barium chloride spasms in concentrations of 1:5,000,000 and 1:1,000,000 respectively. The compound of Example 3 in the form of its hydrochloride shows the same antihistamine activity in concentrations of 2 micrograms per millimeter, relaxed the normal jejunum in concentrations of 1:2,000,000 and combated the acetylchloine and barium chloride spasms in concentrations of 1:1,000,000 and 1:500,000 respectively. The low toxicity of the compounds is illustrated by the fact that the intravenous L. D.50 in rabbits of the compound of Example 1 is 24 mg. per kg. while an intravenous dose of 0.25 mg. per kg. reduces by 50% over a sixty minute period the intestinal response to acetylcholine and decreases intestinal motility, while administration of 0.5 mg. per kg. completely blocks any intestinal response to acetylcholine for sixty minutes. These data as to activity and toxicity of the compounds are given in terms of animal tests or tests on animal tissue because only in such tests are quantitative data with respect to activity or the like obtainable.

*Example 1*

2,2 - diphenyl - 5 - methyl - 5 - dimethylaminomethyl-1,3-dioxane.—A mixture of 20 gm. of 2,2-diphenyl-5-methyl-5-iodomethyl-1,3-dioxane, 23 gm. of dimethylamine and 100 cc. of benzene is heated under pressure at 100° C. for 5 days. The mixture is then cooled, washed with 50 cc. of 8 per cent sodium hydroxide solution and then with water until the wash water is neutral. The benzene is distilled and the residue crystallized from methanol to give 11.7 gm. of product, M. P. 86–87°. The hydrochloride salt is obtained by adding ethereal hydrogen chloride to an ether solution of the base, being careful to avoid any excess of acid. This precipitated salt melts at 175–176° and may be recrystallized from a mixture of alcohol and isopropyl ether. The methiodide of this base is formed when an ethereal solution of the amine is allowed to stand at room temperature for 8 days with a ten-fold excess of methyl iodide. A 62% yield of methiodide separates, M. P. 228–300 (dec.).

*Example 2*

2,2 - diphenyl - 5 - methyl - 5 - diethylaminomethyl-1,3-dioxane.—A mixture of 10 gm. of 2,2-diphenyl - 5 - methyl - 5 - bromomethyl - 1,3 - dioxane, 30 gm. of sodium iodide, 22 gm. of diethylamine, and 150 cc. of absolute alcohol is heated in a pressure vessel at 100° C. for four days. The mixture is cooled, diluted with 200 cc. of 2.5 per cent sodium hydroxide and extracted with three 50 cc. portions of isopropyl ether. The combined extract is dried over potassium carbonate and distilled. The product is collected at 161–163° at 0.01 mm. The yield is 7.7 gm. The hydrochloride salt is obtained by adding ethereal hydrogen chloride to an ether solution of the distilled base, avoiding any excess of acid. After recrystallization from ethyl acetate it melts at 189–190°.

*Example 3*

2,2 - diphenyl - 5 - methyl - 5 - (1 - piperidylmethyl)-1,3-dioxane.—This compound is obtained from the corresponding 5-iodomethyldioxane and piperidine by the procedure of Example 1 above. The methanol recrystallized product is obtained in 70% yield, M. P. 93–94°. The hydrochloride salt obtained from this base and hydrogen chloride in dry ether melts at 141–42° (dec.) after recrystallization from a mixture of butanol and isopropyl ether.

*Example 4*

2,2 - diphenyl - 5 - methyl - 5 - (β-aminoethyl)-1,3-dioxane hydrochlorine.—A mixture of 30 gm. of 2,2-diphenyl-5-methyl-5-iodomethyl-1,3-dioxane, 36 gm. of sodium cyanide and 375 cc. of alcohol is heated in a pressure vessel at 100° C. for three days. The alcohol is then distilled and the residue triturated with water causing it to solidify. It is then crystallized from alcohol. The resulting intermediate, 2,2 - diphenyl - 5-methyl-5-cyanomethyl-1,3-dioxane, weighs 17 gm. and melts at 84–85°. A mixture of 0.78 gm. of lithium aluminum hydride and 50 cc. of dry ether is refluxed until solution is complete. This solution is then stirred and refluxed during the addition, over a 15 minute period, of 6 gm. of the cyanomethyl intermediate dissolved in 100 cc. of dry ether. After an additional 30 minutes refluxing, the mixture is decomposed by the careful addition of a few cc. of water. About 50 cc. of 10% sodium hydroxide solution is then added with stirring. The ether layer is then removed and the water layer twice extracted with 70 cc. portions of ether. The combined ether extract is dried over magnesium sulfate and evaporated. The residue is weighed, dissolved in 400 cc. of dry ether and the calculated amount of ethereal hydrogen chloride added. Prolonged chilling yields a crystalline precipitate of the desired product which may be recrystallized from a mixture of isopropyl ether and absolute alcohol. The yield is 5.2 gm. of material M. P. 187–188°. The acid oxalate salt is prepared from the crude base in ether and recrystallized from butanol and isopropyl ether, M. P. 175–176° (dec.).

*Example 5*

2,2-diphenyl-5-methyl-5-(β - diethylaminoethoxymethyl)-1,3-dioxane hydrochloride.—A mixture of 10 gm. of 2,2-diphenyl-5-methyl-5-hydroxymethyl-1,3-dioxane, 1.6 gm. of sodium, and 75 cc. of dry toluene is refluxed for four hours, cooled, and the solution decanted from the excess sodium. The decanted solution is then mixed with 4.75 gm. of freshly distilled β-diethylaminoethyl chloride and refluxed for four hours. The mixture is filtered to remove sodium chloride, then washed with water until neutral. The toluene is distilled and after weighing the residue replaced by 200 cc. of dry ether. A molar equivalent of ethereal hydrogen chloride is then added. An oily hydrochloride salt separates on chilling. The ether is decanted and replaced by fresh ether several times and chilled until the salt crystallizes. The crystalline salt is dissolved in 100 cc. of hot toluene, the solution decanted and 300 cc. of 90-100° petroleum ether added. Upon chilling a hygroscopic salt crystallizes. Yield 2.5 gm., M. P. 90–93°. The dimethylaminoethoxy compound, prepared in the same way using dimethylaminoethyl chloride, melts at 136–139° C.

*Example 6*

2,2 - dibenzyl-5-methyl-5-diethylaminomethyl-1,3-dioxane hydrochloride.—A mixture of 11 gm. of 2,2-dibenzyl-5-methyl-5-iodomethyl-1,3-dioxane, 19 gm. of diethylamine and 2.7 gm. of sodium carbonate is heated with 100 cc. of absolute alcohol in a pressure vessel at 100° C. for five days. The cooled reaction mixture is filtered leaving 6.1 gm. of unreacted 5-iodomethyl compound. The filtrate is evaporated, redissolved in 100 cc. of benzene, filtered and washed with water until neutral. The benzene is then evaporated and the residue weighed, then dissolved in 400 cc. of dry ether. This solution is treated with the calculated amount of ethereal hydrogen chloride. This solution is allowed to stand in the refrigerator. The crystalline material which separates is finally recrystallized from a mixture of ethyl acetate and ether to give 1.1 gm. of product, M. P. 189–90°.

*Example 7*

2 - phenyl - 2 - (α-thienyl) -5-methyl-5-diethylaminomethyl - 1,3 - dioxane hydrochloride.—A mixture of 9.4 gm. of α-benzoylthiophene, 9.1 gm. of 2-methyl-2-bromomethyl-1,3-propanediol, 100 cc. of benzene and 2 drops of concentrated sulfuric acid is refluxed in an apparatus containing a water trap. After 24 hours 0.85 cc. of water is present in the trap. The mixture is cooled, washed with an excess of 10% sodium carbonate solution and evaporated. The residue which is crude 2-phenyl-2-(α-thienyl)-5-methyl-5-bromomethyl-1,3-dioxane is mixed with 36.5 gm. of diethylamine, 6.4 gm. of sodium carbonate, 22.5 gm. of sodium iodide, and 100 cc. of absolute alcohol. This mixture is heated at 100° C. in a pressure vessel for 5 days, cooled, and filtered. The filtrate is evaporated and the residue dissolved in benzene. It is then washed with 10% sodium carbonate, and then with water until neutral. It is then distilled and the crude product collected at 145–147° at 0.01 mm. Yield, 8 gm. This crude base is dissolved in ether and the calculated amount of ethereal hydrogen chloride added. A crystalline product separates upon cooling and is recrystallized from a mixture of ethyl acetate and isopropyl ether to give 2.3 gm. of product, M. P. 191–192°.

*Example 8*

2,2 - di - α - thienyl-5-methyl-5-diethylaminomethyl-1,3-dioxane hydrochloride.—A mixture of 9.7 gm. of di-α-thienyl ketone, 9.1 gm. of 2-methyl-2-bromomethyl-1,3-propanediol, 0.1 gm. of p-toluenesulfonic acid monohydrate, and 100 cc. of benzene is refluxed under a water trap. After twenty-four hours the mixture becomes very dark. The heating is then discontinued, though only 0.52 cc. (62%) of water appears in the trap. The mixture is washed with sodium carbonate, then with water, and finally evaporated. The residue is triturated with 10 cc. of absolute alcohol and filtered leaving 3.3 gm. of unchanged ketone on the filter. The filtrate containing about 0.03 mole of the desired 5-bromomethyldioxane is mixed with 26.8 gm. of diethylamine, 5.2 gm. of sodium carbonate, 9.7 gm. of sodium iodide, and 75 cc. of absolute alcohol. It is then heated at 100° C. for 5 days in a pressure vessel, cooled, filtered, and the filtrate evaporated. The oily residue is dissolved in benzene and washed with 10% sodium carbonate solution, then with water until neutral. The benzene is evaporated and the residual amine dissolved in 400 cc. of absolute ether to which the calculated amount of ethereal hydrogen chloride is then added. The precipitated salt is filtered at once, dissolved in hot butanol, decolorized with charcoal, and diluted with isopropyl ether. Upon chilling and filtering 1.8 gm. of the desired hydrochloride is obtained, M. P. 211–213° (dec.).

*Example 9*

2,2-di-p-tolyl-5-methyl-5-diethylaminomethyl-1,3-dioxane hydrochloride.—A mixture of 6.9 g. of the 5-iodomethyl compound, 17.7 g. of diethylamine, 2.1 g. of sodium carbonate and 50 cc. of absolute ethanol is heated in a pressure vessel at 100° C. for five days. The precipitated inorganic salt is removed by filtration, and the filtrate evaporated to dryness. The residue is dissolved in 75 cc. of benzene, the mixture filtered, the benzene filtrate washed with sodium carbonate solution, and then with water until the wash water is neutral. After removal of the solvent, the brown oily residue is distilled; yield 4.7 g. of impure base; B. P. 167–170° (0.01 mm.). The impure base is dissolved in 200 cc. of absolute ether, and treated with the calculated amount of ethereal hydrogen chloride. After the mixture is cooled for two days in a refrigerator, the oily precipitate becomes solid and the product is recrystallized from a mixture of isopropyl alcohol and isopropyl ether; yield 1.1 g.; M. P. 199–200°.

*Example 10*

2,2-diphenyl-5-ethyl - 5 - diethylaminomethyl-1,3-dioxane.—A mixture of 12.5 gm. of the 2,2-diphenyl-5-ethyl-5-bromomethyl - 1,3 - dioxane, 10.4 gm. of sodium iodine, 5.5 gm of sodium carbonate, 25.3 gm. of diethylamine and 85 cc. of absolute alcohol is heated in a pressure vessel at 100° C. for five days. The mixture is then filtered the alcohol evaporated and 100 cc. of benzene added. This solution is washed with 25 cc. of 10% sodium carbonate and then with water until the wash water is neutral. The benzene is evaporated and the residue crystallized from methanol; yield 6.9 gm.; M.P. 65–67°. The hydrochloride is obtained by adding the theoretical amount of ethereal hydrogen chloride to the base in ether and recrystallizing the precipitated salt from a mixture of isopropyl alcohol and isopropyl ether. Yield 3.1 gm.; M.P. 206–207° (dec.). The base obtained from this pure hydrochloride by treatment with sodium carbonate has a M. P. of 67–68° and is unchanged by crystallization from aqueous methanol.

Example 11

2,2 - diphenyl - 5 - methyl - 5 - morpholinomethyl-1,3-dioxane.—A mixture of 10 g. of 2,2-diphenyl-5-methyl-5-iodomethyl-1,3-dioxane, 22 g. of morpholine and 50 cc. of benzene is heated in a pressure vessel at 100° for five days. The mixture of liquid and crystals (morpholine hydroiodide) is washed with water until the wash water is neutral. The benzene layer is separated, the solvent removed, and the residue rubbed until it becomes solid. This material still contains some unchanged 5-iodomethyl compound. The crude product is dissolved in dry ether and treated with the amount of ethereal hydrogen chloride which would be required for the conversion of pure base into the hydrochloride. The precipitated hydrochloride is filtered, dissolved in water, filtered, and the filtrate made alkaline with sodium carbonate. The precipitated base weighs 3.6 g. (41%); M. P. 122°. The base melts at the same temperature after recrystallization from methanol. The hydrochloride is prepared by the addition of the calculated amount of ethereal hydrogen chloride; M. P. 197–199° (dec.); M. P. 197–199° (dec.) after recrystallization from absolute ethanol-isopropyl ether.

Example 12

2,5 - dimethyl - 5 - diethylaminoethyl - 1,3 - dioxane methiodide.—A mixture of 12.3 g. of the 5-bromomethyl compound, 43.5 g. of sodium iodide, 9.3 g. of sodium carbonate, 43 g. of diethylamine and 100 cc. of absolute ethanol is heated in a pressure vessel at 100° for five days. The mixture is filtered, the alcohol removed, 100 cc. of benzene added to the residue, and the mixture filtered. The benzene solution is washed with water, the benzene evaporated, and the residue distilled; B. P. 72–77° (2 mm.). The distillate, a yellow oil (10.3 g.), still contains some of the unchanged 5-bromomethyl (or 5-iodomethyl) compound. A mixture of 2.5 g. of the impure 5-diethylaminomethyl compound, 17.7 g. of methyl iodide and 50 cc. of dry chloroform is heated in a pressure vessel at 100° for four hours. The chloroform and excess methyl iodide are removed by distillation, and the residue triturated under dry ether. The product is recrystallized from absolute ethanol-ether; yield 1.3 g. (26%); M. P. 115–117°.

Example 13

2,5 - dimethyl - 2 - cyclopropyl - 5 - diethylaminomethyl-1,3-dioxane methiodide.—A mixture of 7.8 g. of the 5-bromomethyl compound, 23.4 g. of sodium iodide, 5 g. of sodium carbonate, 33.6 g. of diethylamine and 100 cc. of absolute ethanol is heated in a pressure vessel for five days at 100°. The inorganic precipitate is removed by filtration, and the alcohol removed from the filtrate. After the addition of 100 cc. of benzene to the residue, the mixture is filtered, and the benzene filtrate washed with water. After distillation of the benzene, the residue is fractionated; yield 5.5 g. of impure base; B. P. 108–11° (4 mm.). 2.5 g. of the impure base, 14.7 g. of methyl iodide and 40 cc. of dry chloroform are heated in a pressure vessel at 100° for four hours. The chloroform and excess methyl iodide are removed, and the oily residue triturated with dry ether. The stiff, gummy product is recrystallized from a mixture of absolute alcohol and dry ether; yield 1.2 g. (21%); M. P. 104–107°.

Example 14

5 - methyl - 5 - diethylaminomethyl - 1,3 - dioxane hydrochloride.—A mixture of 5.2 g. of the 5-bromomethyl compound, 20 g. of sodium iodide, 4.3 g. of sodium carbonate, 29.2 g. of diethylamine, and 55 cc. of absolute ethanol is heated for six days in a pressure vessel at 100°. The inorganic salts are removed by filtration, and the alcohol distilled from the filtrate. The residue is treated with 50 cc. of anhydrous ether, the mixture filtered, and the ether removed from the filtrate. When the residue is distilled, 3.4 g. of impure base is obtained; B. P. 68–70° (3 mm.). The impure base (1.3 g.) is dissolved in 200 cc. of dry ether, and the calculated amount of ethereal hydrogen chloride, required for the formation of the hydrochloride, added. After the mixture has been cooled in a refrigerator for one day, the crystalline precipitate (1.2 g.) is filtered; M. P. 103–104°. The hydrochloride melts at the same temperature after recrystallization from ethyl acetate. To produce the methiodide the impure base (1.5 g.), 11.4 g. of methyl iodide and 30 cc. of dry chloroform are heated in a pressure vessel at 100° for three hours. After removal of the chloroform and excess methyl iodide, the residue solidifies; M. P. 155–156° after recrystallization from isopropyl alcohol; yield 1.5 g. (38%).

Example 15

2,2,5 - trimethyl - 5 - diethylaminomethyl - 1,3-dioxane methiodide.—A mixture of 8.1 g. of the 5-bromomethyl compound, 27.1 g. of sodium iodide, 5.76 g. of sodium carbonate, 39.8 g. of diethylamine, and 90 cc. of absolute ethanol is heated at 100° for six days in a pressure vessel, cooled, filtered and the alcohol removed from the filtrate. The residue is extracted with 200 cc. of ether, the solvent evaporated from the extract, and the residue distilled. The yield of impure base is 6.7 g.; B. P. 71–72° (3 mm.). The methiodide is obtained in the following manner: 2.5 g. of the impure base, 16.5 g. of methyl iodide and 50 cc. of dry chloroform are heated for four hours at 100° in a pressure vessel. After removal of the chloroform and excess methyl iodide, the residue is triturated under dry ether, and then recrystallized from isopropyl alcohol; yield 2.3 g. (46%); M. P. 138–139°.

Example 16

2,2-pentamethylene-5-methyl - 5 - diethylaminomethyl-1,3-dioxane hydrochloride.—A mixture of 11.0 g. of the 5-bromomethyl compound, 18.8 g. of sodium iodide, 6.7 g. of sodium carbonate, 30.5 g. of diethylamine, and 85 cc. of absolute ethanol is heated in a pressure vessel for six days at 100°, filtered, and the alcohol removed. The residue is stirred with 100 cc. of benzene, filtered, the benzene solution washed with sodium carbonate solution and then with water. The benzene is evaporated, and the oily residue distilled. The base contaminated with iodide, boils at 123–125° (3 mm.); yield 8.8 g. Four grams of the impure base was dissolved in 650 cc. of dry ether, and the required amount of ethereal hydrogen chloride added. After the mixture has remained in a refrigerator for twelve hours, the crystalline precipitate is filtered, and recrystallized from ethyl acetate; M. P. 146–147°; yield 2.3 g. (40%). To produce the methiodide, a mixture of 4.2 g. of the impure base, 23.4 g. of methyl iodide and 50 cc. of chloroform is heated in a pressure vessel for four hours at 100°. The oil, obtained after removal of the solvent and excess methyl iodide, is triturated with dry ether. After recrystallization from a mixture of butyl alcohol and ether, 2.0 g. (26%) of a slightly yellow solid is obtained; M. P. 109-111°. The compound becomes colorless after recrystallization from a mixture of acetone and ether but the melting point is not changed.

Example 17

2-phenyl-5-methyl-5-diethylaminomethyl-1,3-dioxane.—A mixture of 14.3 g. of the 5-bromomethyl compound, 23.7 g. of sodium iodide, 8.4 g. of sodium carbonate, 38.6 g. of diethylamine, and 100 cc. of absolute ethanol is heated at 100° in a pressure vessel for seven days, the mixture filtered, and the alcohol evaporated. The residue is treated with 100 cc. of benzene and 20 cc. of 10% sodium carbonate solution. The benzene layer is then separated and washed with water until the wash water is neutral. After removal of the benzene, the residue is distilled; yield 7.6 g. of impure base, B. P. 147-154° (3 mm.). To purify the base, it is converted into the hydrochloride. The base (3.4 g.) is dissolved in 450 cc. of dry ether, and the calculated amount of ethereal hydrogen chloride added. The precipitated hydrochloride is generally oily. The ether is decanted, and the oily salt treated with excess sodium carbonate solution. The base is extracted with benzene and the extract dried over magnesium sulfate. After removal of the solvent, and distillation of the residue, 1.76 g. of amine is obtained; B. P. 144-146° (2 mm.). To obtain the picrate, 0.26 g. of the pure base is treated with 10 cc. of a saturated, absolute ethanol solution of picric acid. Then 100 cc. of dry ether is added, and the mixture cooled in a refrigerator for ten days. The precipitated yellow crystals weigh 0.46 g.; M. P. 126-127°. After recrystallization from ethyl acetate-ether, the picrate melts at 129-130°.

Example 18

2-phenyl-2,5-dimethyl-5-diethylaminomethyl-1,3-dioxane hydrochloride.—A mixture of 11.0 g. of the 5-bromomethyl compound, 17.2 g. of sodium iodide, 6.2 g. of sodium carbonate, 28.2 g. of diethylamine, and 80 cc. of absolute ethanol is heated in a pressure vessel at 100° for six days, and then treated in the manner which has been described. The oily impure base boiled at 137-140° (3 mm.), and weighed 9.5 g. To obtain the hydrochloride, 5 g. of the base is dissolved in 450 cc. of dry ether, and treated with the calculated amount of ethereal hydrogen chloride. After the mixture has been cooled for about a week in the refrigerator, the oily salt becomes crystalline. It is recrystallized from a mixture of isopropyl alcohol and isopropyl ether; M. P. 124-126°.

Example 19

2-cyclohexyl-2-phenyl-5-methyl-5-diethylaminomethyl-1,3-dioxane hydrochloride.—A mixture of 6.1 g. of the 5-iodomethyl compound, 1.6 g. of sodium carbonate, 16.6 g. of diethylamine, and 50 cc. of absolute ethanol is heated for six days at 100° in a pressure vessel. After filtration, the alcohol and excess diethylamine are removed, and the semi-solid residue rubbed under 2 cc. of methanol. After the product has been recrystallized from a very small amount of 95% ethanol, 3.9 g. (65%) of material is obtained which is unchanged 5-iodomethyl compound. The alcoholic mother liquor is heated to remove the alcohol, benzene is added to the residue, and then removed by distillation in order to free the product from water. The oily product is dissolved in 200 cc. of dry ether, and 0.0054 mole of hydrogen chloride, dissolved in dry ether, added. The semi-solid hydrochloride, which precipitates, is cooled in a refrigerator for twelve hours whereupon it becomes crystalline. After recrystallization from a mixture of isopropyl alcohol and isopropyl ether, the hydrochloride melts at 203-204° (dec.); yield 0.63 g.

Example 20

2,5-dimethyl-2-(3-thianaphthenyl)-5-diethylaminomethyl-1,3-dioxane methiodide.—A mixture of the oily bromide from Example 15a, 37.5 g. of sodium iodide, 7.9 g. of sodium carbonate, 36.5 g. of diethylamine and 75 cc. of absolute ethanol is heated in a pressure vessel at 100° for six days. The organic salts are removed by filtration, and the alcohol evaporated. The residue is mixed with 100 cc. of benzene and 50 cc. of 5% sodium carbonate solution. The benzene layer is separated, and washed with water until the wash water is neutral. After removal of the benzene, the residue is distilled; B. P. 155-158° (0.04 mm.). The yield of impure 5-diethylaminomethyl compound is 10.8 g. The methiodide is obtained in the following manner: A mixture of 4 g. of the impure base, 17 g. of methyl iodide and 50 cc. of dry chloroform is heated in a pressure vessel at 100° for five hours. The excess methyl iodide and the chloroform are evaporated. The residue is triturated under dry ether, and then dissolved in isopropyl alcohol. Upon addition of ether, the methiodide precipitates. It melts at 195-196° (dec.) after recrystallization from a mixture of acetone and ether; yield 1.7 g.

Example 21

2,2-diphenyl-5-methyl-5-isopropylaminomethyl-1,3-dioxane hydrochloride.—This is obtained by the procedure of Example 1 using 31 gm. of isopropylamine in place of the dimethylamine. On purification by recrystallization from a mixture of isopropylether and alcohol it melts at 227-8° C. (dec.).

Example 22

2,2-diphenyl-5-methyl-5-methylaminomethyl-1,3-dioxane hydrochloride.—This is obtained by the procedure of Example 1 using 15 gm. of methylamine in place of the dimethylamine. On purification by recrystallization from absolute alcohol it melts at 226-7° C. (dec.).

I claim:

1. Substituted 1,3 dioxanes of the formula

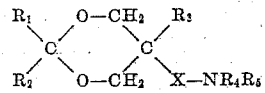

in which X is a low molecular weight saturated aliphatic group having 1 to 3 carbon atoms selected from the group consisting of alkylene radicals and oxygen-interrupted alkylene radicals, $R_1$ and $R_2$ are selected from the group consisting of hydrogen and lower alkyl, cycloalkyl containing not more than 6 carbon atoms, phenyl, tolyl, benzyl, thianaphthenyl and thienyl radicals and radicals in which $R_1$ and $R_2$ taken together form a cyclohexyl ring with the 2-carbon, $R_3$ is selected from the group consisting of hydrogen and methyl and ethyl radicals, and $R_4$ and $R_5$ are selected from the group consisting of hydrogen, low molecular weight alkyl radicals and radicals in which $R_4$ and $R_5$ taken together form a member selected from the group consisting of piperidyl and morpholino structures with the nitrogen.

2. 2,2 - diphenyl - 5 - methyl - 5 - dimethylaminomethyl - 1,3 - dioxane.

3. 2,2 - diphenyl - 5 - methyl - 5 - diethylaminomethyl-1,3-dioxane.

4. 2,2 - diphenyl - 5 - methyl - 5 - (1 - piperidylmethyl) - 1,3 - dioxane.

FREDERICK F. BLICKE.

REFERENCES CITED

The following references are of record in the file of this patent:

UNITED STATES PATENTS

| Number | Name | Date |
|---|---|---|
| 2,370,586 | Senkus | Feb. 27, 1945 |
| 2,439,969 | Fourneau | Apr. 20, 1948 |
| 2,485,987 | Senkus | Oct. 25, 1949 |